US011780683B2

(12) United States Patent
Testa

(10) Patent No.: US 11,780,683 B2
(45) Date of Patent: Oct. 10, 2023

(54) CONFIGURABLE ASSEMBLY FOR CONVEYING PRODUCTS, IN PARTICULAR SLICED FOOD PRODUCTS

(71) Applicant: ELCAT S.R.L., Sanfre' (IT)

(72) Inventor: Mauro Testa, Sanfre' (IT)

(73) Assignee: ELCAT S.R.L., Sanfre' (IT)

( * ) Notice: Subject to any disclaimer, the term of this patent is extended or adjusted under 35 U.S.C. 154(b) by 0 days.

(21) Appl. No.: 17/752,472

(22) Filed: May 24, 2022

(65) Prior Publication Data

US 2022/0380140 A1    Dec. 1, 2022

(30) Foreign Application Priority Data

May 25, 2021  (IT) .................. 102021000013481

(51) Int. Cl.
| | |
|---|---|
| *B65G 47/26* | (2006.01) |
| *B65G 47/30* | (2006.01) |
| *B65G 15/10* | (2006.01) |
| *B65G 47/71* | (2006.01) |

(52) U.S. Cl.
CPC ............ *B65G 47/30* (2013.01); *B65G 15/10* (2013.01); *B65G 47/715* (2013.01); *B65G 2201/0202* (2013.01)

(58) Field of Classification Search
CPC ........ B65G 15/10; B65G 47/26; B65G 47/30; B65G 47/715; B65G 2201/0202
USPC .... 198/369.7, 432, 445, 446, 456, 583, 586, 198/861.1
See application file for complete search history.

(56) References Cited

U.S. PATENT DOCUMENTS

| | | | | |
|---|---|---|---|---|
| 5,996,665 A | * | 12/1999 | Poisson ................ | B65G 15/105 425/371 |
| 6,152,284 A | | 11/2000 | Sandberg et al. | |
| 6,739,445 B2 | * | 5/2004 | Armstrong ........... | B65G 47/647 198/435 |
| 7,073,656 B2 | * | 7/2006 | Gust .................... | B65G 47/088 198/452 |
| 7,380,650 B2 | * | 6/2008 | Gamberini ............ | B65G 47/71 198/445 |

(Continued)

FOREIGN PATENT DOCUMENTS

| | | |
|---|---|---|
| DE | 102014117392 | 6/2016 |
| EP | 0909724 | 4/1999 |

OTHER PUBLICATIONS

Italian Search Report and Written Opinion dated Feb. 11, 2022, in connection with Italian Application No. IT202100013481 (7 pages).

*Primary Examiner* — Douglas A Hess
(74) *Attorney, Agent, or Firm* — MCCRACKEN & GILLEN LLC

(57) ABSTRACT

A configurable assembly is provided for conveying products along a longitudinal direction; the assembly has a supporting structure and at least two conveyor units; at least one of said units is provided with at least two tracks which receive, in use, respective products and diverge from or converge towards each other along a lateral direction, proceeding longitudinally from an inlet to an outlet; the units are movable with respect to the supporting structure by the action of an actuator device between a working area and at least one storage area, so as to selectively arrange one of said units in the working area.

10 Claims, 4 Drawing Sheets

(56) References Cited

U.S. PATENT DOCUMENTS

| | | | | |
|---|---|---|---|---|
| 7,874,246 B2* | 1/2011 | Pryor | ................. | A21C 9/085 |
| | | | | 198/419.1 |
| 9,173,432 B2* | 11/2015 | Kodali | ................. | B65G 37/00 |
| 9,265,261 B2* | 2/2016 | Haas | ................. | B65G 39/16 |
| 9,505,562 B2* | 11/2016 | Petrovic | ................. | B65G 37/00 |
| 9,809,401 B2* | 11/2017 | Mayer | ................. | B65G 47/084 |

\* cited by examiner

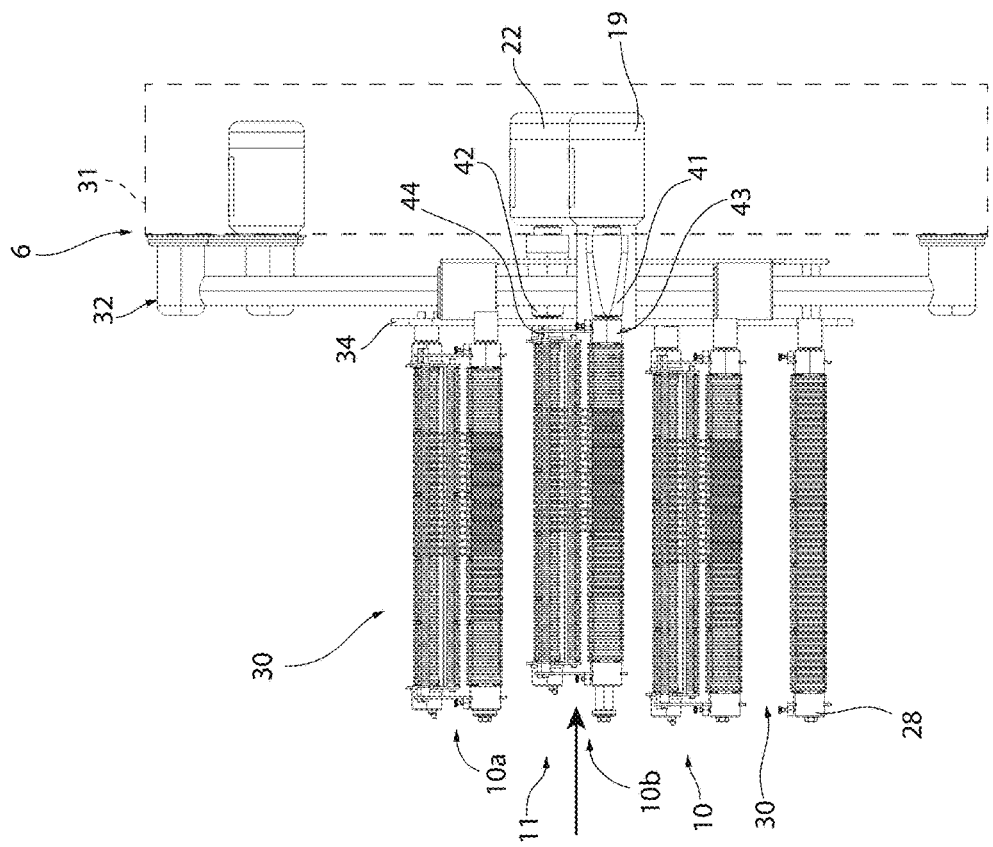
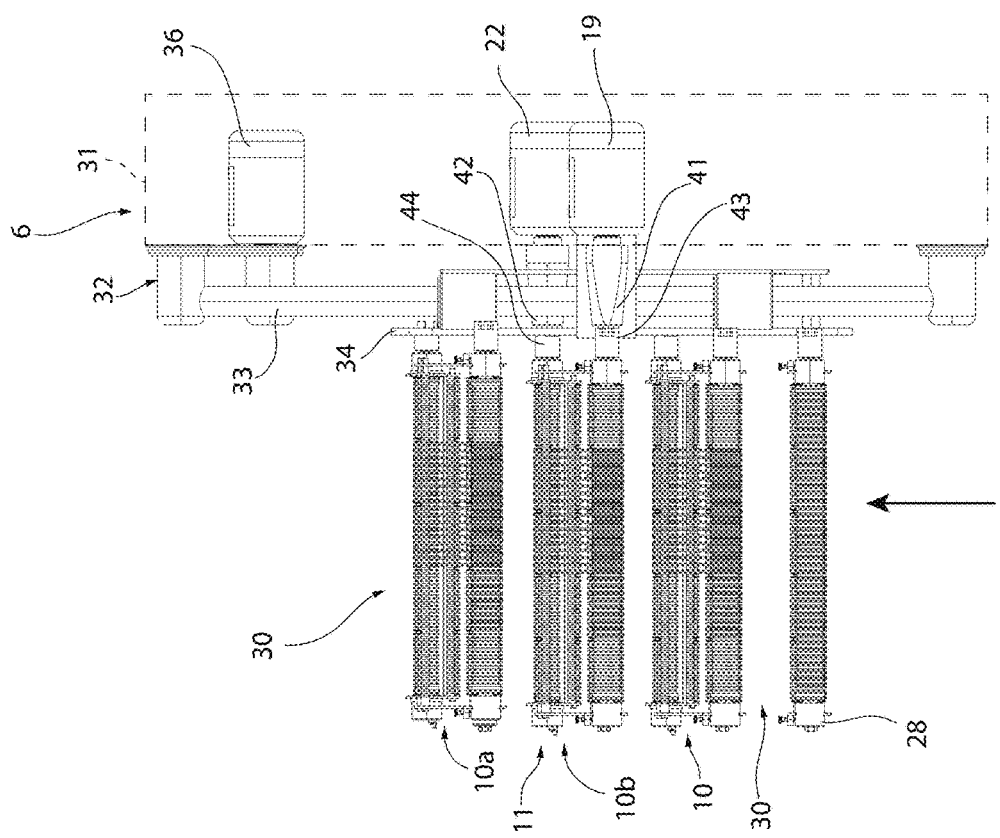
FIG. 3B
FIG. 3A

CONFIGURABLE ASSEMBLY FOR CONVEYING PRODUCTS, IN PARTICULAR SLICED FOOD PRODUCTS

CROSS-REFERENCE TO RELATED APPLICATIONS

This patent application claims priority from Italian Patent Application No. 102021000013481 filed on May 25, 2021, the entire disclosure of which is incorporated herein by reference.

TECHNICAL FIELD OF THE INVENTION

The present invention relates to a configurable assembly for conveying products, in particular sliced food products.

STATE OF THE ART

In the field of food products, it is known to install units for superimposing sliced products along a conveyor line between a slicing machine and a packaging machine. These units, known for example from EP3069836A1 and EP0274229A2, are configured so as to superimpose, in a lateral direction, two products which arrive longitudinally from the slicing machine in mutually parallel directions. This type of unit has a motorized conveyor system transporting the products along an upper track and a lower track, which start from the same inlet roller, are arranged side by side, and diverge from each other, upwards and/or downwards, at said inlet roller, ending at respective outlet rollers which are arranged at different heights and are at least partially superimposed in the lateral direction. Therefore, the sliced products which are transported along the upper track fall from the corresponding outlet roller onto the sliced products which are transported along the lower track.

This type of system has the need to provide a so-called "format changeover", i.e., the need to change the type and/or size of the food products to be packaged, or to change the type of packaging, so it is also necessary to change the units that convey and superimpose the sliced products. In order to obtain the "format changeover", document EP3069836A1 teaches how to make these units modular, so that they can be completely removed from a supporting frame where they are mounted, and so that other units suitable for the new product format can be mounted in their place.

There is a need to improve the above-described known solutions, in particular to reduce the time for replacing the units and/or to reduce the risks of errors, damage or injuries that may occur during manual replacement of these same units by the operators.

SUBJECT AND SUMMARY OF THE INVENTION

The object of the present invention is therefore to provide a configurable assembly for conveying products, in particular sliced food products, which allows the above-mentioned requirement to be met in a simple and inexpensive way.

According to the present invention, a configurable assembly for conveying products, in particular sliced food products, is provided as defined in claim 1.

BRIEF DESCRIPTION OF THE DRAWINGS

The invention will now be described with reference to the accompanying drawings, which illustrate a non-limiting embodiment thereof, in which:

FIGS. 3A and 3B schematically show a sequence of operations for configuring a conveyor assembly according to a preferred aspect of the present invention.

DETAILED DESCRIPTION OF PREFERRED EMBODIMENTS OF THE INVENTION

Figure 1:
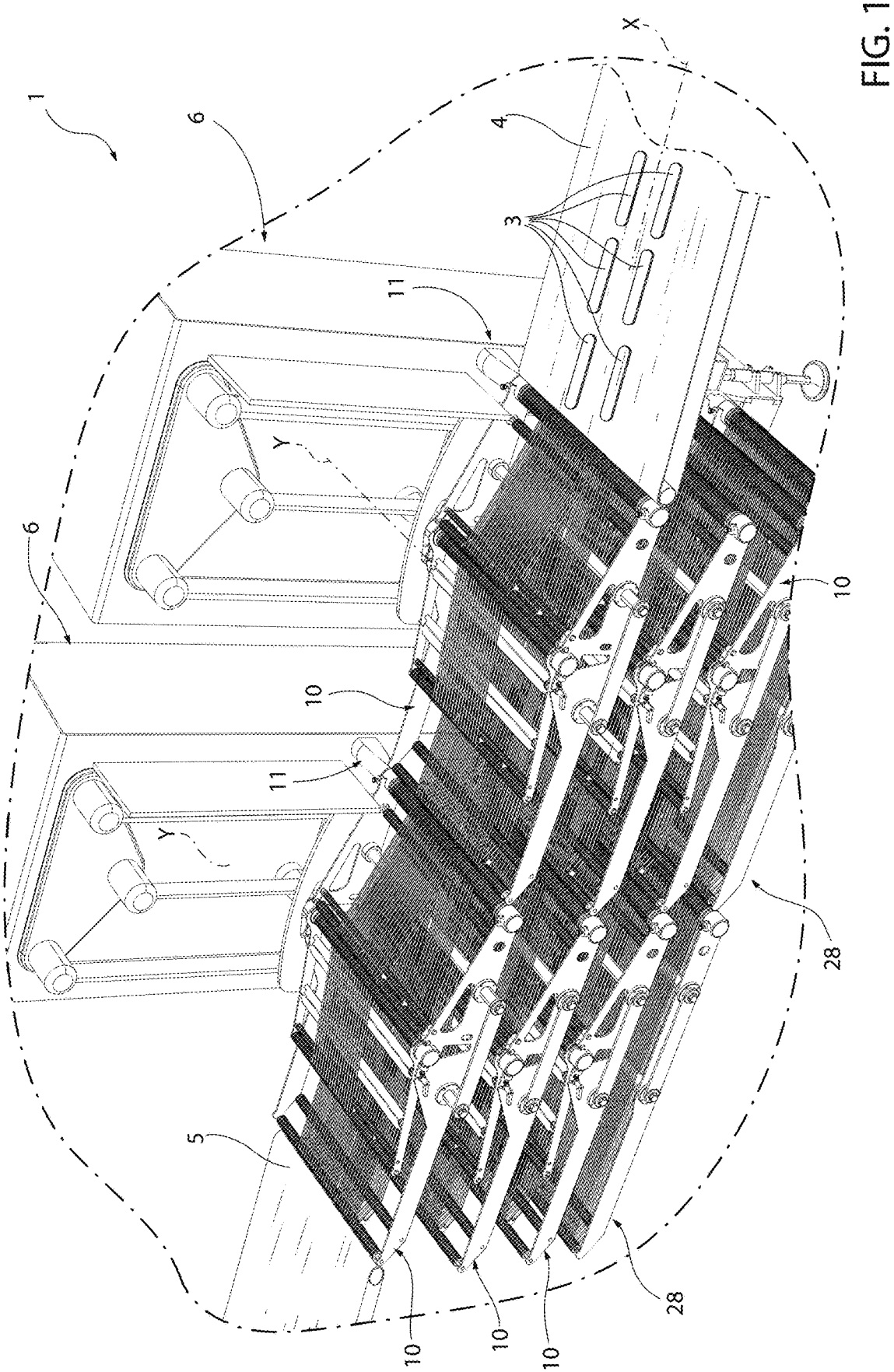
FIG. 1 is a perspective view showing a conveyor line provided with two configurable assemblies for conveying products, made according to the teachings of the present invention.

In FIG. 1, reference numeral 1 designates, as a whole, a conveyor line (partially shown) extending along a longitudinal path or direction X between a first and a second machine (not shown) forming part of a system for the production and/or processing and/or packaging of products 3, for example food products. In this case, the second machine, arranged downstream of the line 1 along direction X, is a packaging machine, whereas the first machine, upstream of the line 1, is a slicing machine, therefore the products 3 are defined by sliced food products.

The line 1 comprises an inlet conveyor 4 and an outlet conveyor 5, which are partially illustrated. For example, the conveyor 4 may be a component forming part of said first machine, and/or the conveyor 5 may be a component forming part of said second machine.

The line 1 further comprises at least one conveyor assembly 6, located between the conveyors 4 and 5. In the specific example shown, the line 1 comprises two assemblies 6, which are arranged in series along direction X, for example directly one after the other (i.e., without intermediate components).

Figure 2:
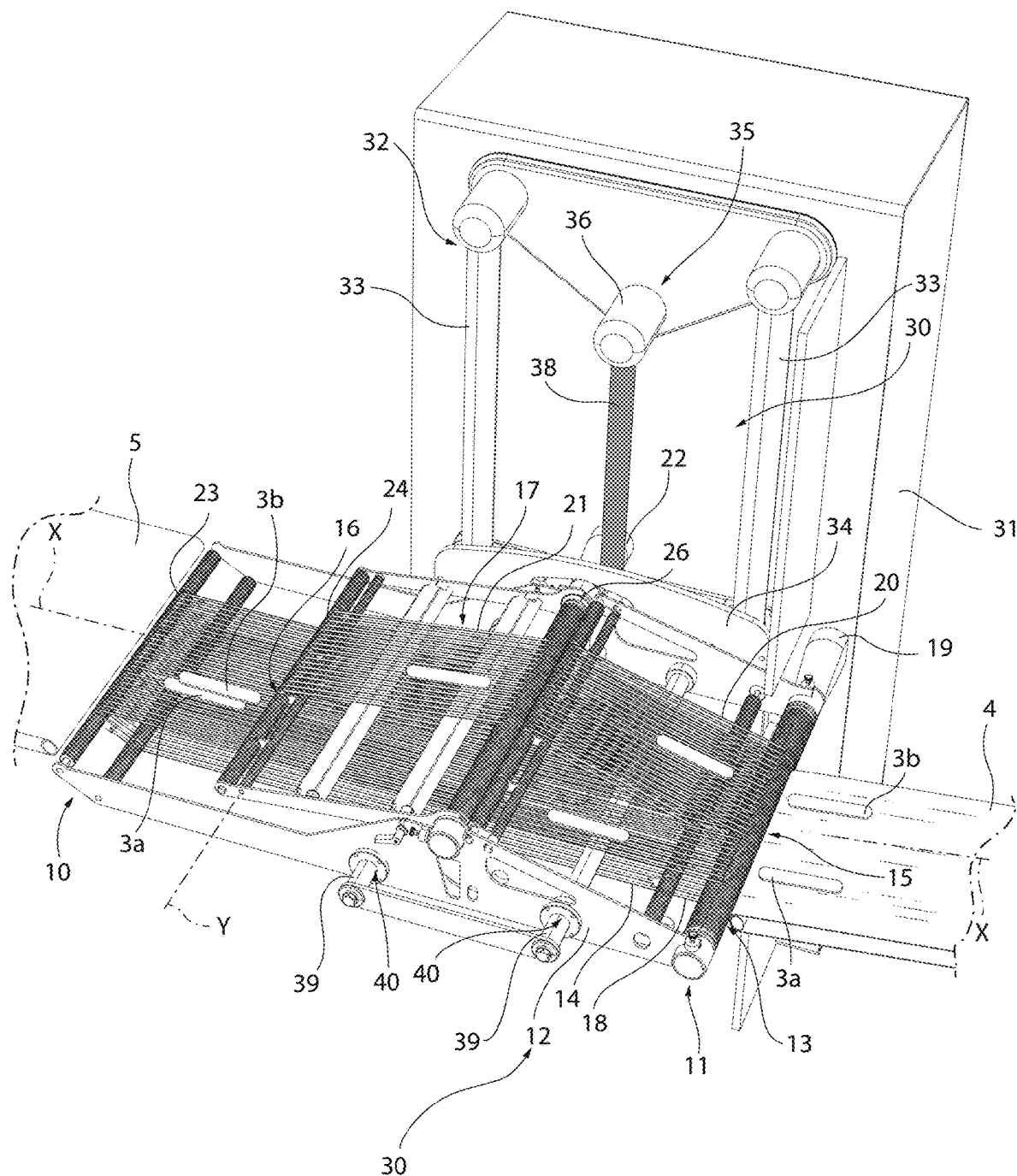
FIG. 2 is a different perspective view showing, on an enlarged scale, a detail of a conveyor assembly according to the present invention.

The assembly 6 comprises a plurality of units 10, each capable of conveying the products 3 longitudinally and, at the same time, superimposing them along a lateral direction Y, which is horizontal and orthogonal to direction X. As also shown in FIG. 2 and as will be explained in detail below, each unit 10 can receive at least two products (or two sets of products) 3a and 3b, which are transferred longitudinally by the conveyor 4 in parallel directions (and, in particular, side by side), move the products 3b in direction Y and superimpose or queue them on/after the products 3a, while the products 3a and 3b are transferred by the same unit 10 to the conveyor 5.

Each assembly 6 can be configured to provide a so-called "format changeover", i.e., to obtain various superimposing or queuing configurations at the conveyor 5, depending on the size, shape and/or number of products 3 entering, or depending on specific packaging requirements (for example, depending on the size and/or type of packaging). In particular, on each assembly 6, after selecting the unit 10 to be actually used, said unit 10 is arranged in a working area 11 aligned with the conveyors 4 and 5 along the path or direction X that must be followed by the products 3a and 3b.

The unit 10 shown in FIG. 2 will now be described in greater detail, it being understood that the other units 10 mounted on the assembly 6 have the same characteristics.

The unit 10 comprises a supporting frame 12 and a conveyor system 14, which is supported by the frame 12, receives the products 3a and 3b at an inlet 15 thereof, and transports the products 3a along a lower track 16 and the products 3b along an upper track 17. In the specific example, the system 14 comprises: a conveyor 18, which defines the entire lower track 16 and, in the working area 11, is operated by a motor 19; a conveyor 20, which defines an initial portion of the upper track 17 and, in the working area 11, is operated by the same motor 19; and a conveyor 21, which defines an end portion of the upper track 17 and, in the working area 11, is operated by a motor 22 independently controlled by the motor 19. The conveyors 20 and 21 are longitudinally separated from each other by a gap whose width must be as small as possible, so as to transfer the products 3*b* between the two portions of the upper track 17 without damage or loss.

According to variants not shown, the system 14 can consist of a different number of conveyors and/or be operated in a different way, with respect to the specific solution considered; for example: the track 17 could be continuous (as in EP3069836), or the two conveyors forming the track 17 could be associated with the same motor (as in EP0274229A2), and/or the lower track 16 could consist of two or more separate conveyors, one after the other.

Preferably, each conveyor 18, 20 and 21 is of the multi-belt type, i.e., the conveying surface is defined by a series of flexible belts or cables, which are parallel and wound on corresponding pulleys or rollers. According to alternatives not shown, the conveying surface of the conveyors could be defined by a belt, a net, a series of blocks arranged in succession, etc. . . .

The inlet 15 is defined by a roller or shaft, parallel to direction Y, in common with the conveyors 18 and 20. The tracks 16 and 17 diverge from one another, upwards and/or downwards (i.e., they move away from one another in the vertical direction), starting from the inlet 15 and, at the latter, are side by side along direction Y, so as to receive the products 3*a* and 3*b*, respectively; in other words, the products 3*a* pass from the conveyor 4 onto the track 16, while the products 3*b* pass onto the track 17.

The tracks 16 and 17 end at respective outlets 23 and 24 defined by shafts or rollers parallel to direction Y: the outlet 24 of the upper track 17 is arranged higher than the lower track 16 and is at least partially superimposed over the lower track 16 along direction Y, so that the products transported along the track 17 fall, from the outlet 24, onto the products 3*a* which are transported by the track 16. The degree of lateral separation or superimposition of the track 17 is adjusted by moving the conveyor belts laterally with the idle pulleys on which said belts are wound, at the outlet 24, manually (for example, using mechanical end-of-stroke abutments and/or predefined grooves) or by means of electric or pneumatic actuators (not shown).

As mentioned above, the motors 19 and 22 are controlled independently of each other, in particular to adjust the relative speed of the products 3*a* and 3*b*, and thus to compensate for any difference in length between the tracks 16 and 17 and/or to vary the separation between the products 3*a* and 3*b* along direction X at the outlet 23. For example, it is also possible to vary the speed so much as to have a longitudinal separation which does not allow superimposition, so that the products 3*a* and 3*b* are simply queued one after the other.

Preferably, the motor 19 operates the roller or shaft provided at the inlet 15, so as to operate the conveyors 18 and 20, simultaneously and at the same speed. The motor 22, on the other hand, operates a roller or shaft defining an inlet 26 of the conveyor 21 (alternatively, it could operate the shaft or roller provided at the outlet 24).

In general, the characteristics of the unit 10 are known per se, or in any case do not affect the characteristics of the present invention which allow the unit 6 to be configured based on the "format changeover". In particular, for each assembly 6, the units 10 may differ from each other as regards one or more of the following factors, in order to obtain such a "format changeover": the number of tracks (for example, based on the number of products provided in entrance and/or the number of packages provided in the packaging machine, along direction Y); the degree of superimposition along direction Y (in view of this difference, the possibility of laterally adjusting the conveyor belts at the outlet 24 on each unit 10 could be omitted).

Figure 4:
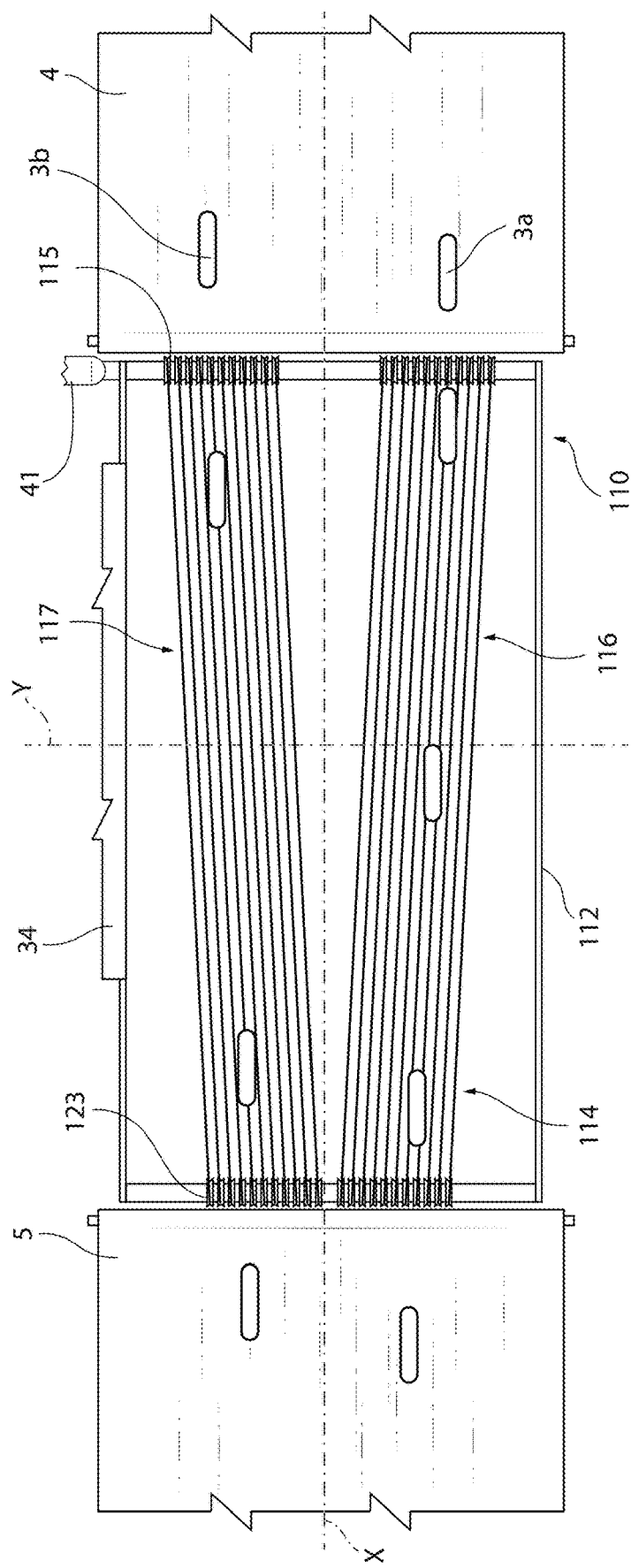
FIG. 4 is a top view of a variant of what is shown in FIG. 2.

With reference to the variant partially shown in FIG. 4, in combination with or as an alternative to the units 10, the assembly 6 may comprise one or more units 110, in which the conveyor system 114 has two or more tracks 116,117, which lie in a same plane; that is, they do not diverge upwards and/or downwards at the inlet 115. On the other hand, the tracks 116,117 converge laterally towards each other (i.e., they move towards each other along direction Y), proceeding from the inlet 115 towards the outlet 123 (as the tracks 16 and 17 of the unit 10 also do, although no superimposition or queuing is performed in this case). In this way, the products 3*a* and 3*b* approach each other laterally so as to be longitudinally aligned with the packages which will be provided in the packaging machine downstream of the line 1. According to variants not shown, the tracks 116 and 117 can also diverge laterally, instead of converging, from the inlet 115 to the outlet 123.

In addition to the units 10 and/or 110, the assembly 6 may also comprise a unit 28 (FIG. 1) defined by a conveyor with a single track for transferring the products 3*a* and 3*b* longitudinally without any mutual lateral separation, that is, maintaining their distance along direction Y during longitudinal transport.

The units 10,110,28 that have not been selected (and therefore are not arranged in the working area 11) remain stored, in a non-operating condition, in at least one storage area 30. In the example shown, two storage areas 30 are provided above and below the working area 11, respectively. Therefore, the assembly 6 defines a storage, where the various units 10,110,28 can be moved between the working area 11 and the storage area 30.

Preferably, the assembly 6 comprises a supporting structure 31 and a guide device 32, which couples the frames of the units 10,110,28 to the structure 31 and, in particular, enables the units 10,110,28 to be translated in a straight, vertical direction.

In greater detail, the device 32 comprises a guide 33, for example defined by two vertical uprights, and a slide or slider 34, which translates along the guide 33 under the action of an actuator device 35. Purely by way of example, the device 35 comprises a motor 36 and a screw-and-nut transmission. This transmission has a nut (not shown) carried by the slide 34 and a screw 38, which is arranged, for example, in an intermediate position between the two vertical uprights of the guide 33, engages the nut, and can rotate about its vertical axis under a (direct or indirect) action of the motor 36.

The movement operated by the device 35 considerably simplifies the replacement of the units 10,110,28 and the configuration of the assembly 6 (compared to those solutions in which the units 10,110,28 must be disassembled and reassembled), due to the high weight that these units often have.

The units 10,110,28 are coupled to the slide 34 by means of respective supports 39. In the particular example shown, the supports 39 comprise (for each unit 10,110,28) a pair of bars, which are parallel to direction Y and engage respective seats 40 formed in the frame of the corresponding unit 10,110,28.

According to a preferred aspect of the present invention, the motors 19 and 22 are not movable together with the slide 34, but are carried by the structure 31 in fixed reference positions. In this way, the number of motors in the assembly 6 is reduced, and the weight carried in motion by the slide 34 is reduced. With reference to FIGS. 3A and 3B, the motors 19 and 22 comprise respective couplings 41 and 42 suitable for coupling to motor shafts 43 and 44 of the unit (10b) that is arranged in the working area 11. The motor shafts 43 and 44 are those arranged at the inlets 15 and 26, but according to variants that are not shown, idle transmissions or different operating configurations can also be provided.

Two types of solutions can be adopted for coupling the motor shafts 43 and 44 to the couplings 41 and 42, in order to then transmit the rotational motion.

In a first case, the coupling is such as not to affect the translation of the slide 34; for example, this type includes friction joints with rollers or shafts that are deformable and parallel, and magnetic joints; therefore, when the selected unit 10b is in the working area 11, its motor shafts 43 and 44 are ready to receive motion directly from the couplings 41 and 42, without any mechanical engagement and/or disengagement action.

In a second case, the coupling is such as to interfere with the translation of the slide 34; therefore, a mechanical engagement and disengagement action is required to couple and decouple the motor shafts 43 and 44 to/from the couplings 41 and 42; for this purpose, each of the units 10,110,28 can preferably move along direction Y with respect to the slide 34 (FIG. 3B): for example, the frames 12 are able to translate along the corresponding supports 39, which therefore define a guide for the engagement and disengagement of the motors 19,22. This translation can be carried out manually or, according to a variant not shown, by means of an electric or pneumatic actuator, controlled by an operator or by an electronic control unit for the automated management of the format changeover.

FIG. 3A shows one of the configuration operating steps, in which the slide 34 is translated (upwards) to move a unit 10a from the working area 11 into the storage area 30 and, at the same time, to bring a new unit 10b into the working area 11, as required by the format changeover. The translation along the guide 33 is carried out after the unit 10a has been laterally translated to separate its motor shafts 43a and 44a from the couplings 41 and 42 (in a manner not shown). Preferably, one or more sensors (not shown) are provided to detect when the disengagement is actually completed and therefore there is no longer interference with the translation of the slide 34, so as to provide a corresponding consent signal which authorizes the operation of the device 35. Once the translation of the slide 34 along the guide 33 is completed, the unit 10b is located in the working area 11 and therefore can be moved towards the structure 31, as shown in FIG. 3B, to engage its motor shafts 43 and 44 to the couplings 41 and 42.

According to variants not shown, the engagement and disengagement actions could be assigned to the motors 19 and 22 (for example, with a movement along direction Y with respect to the structure 31), or to suitable clutches provided at the couplings 41 and 42, instead of moving the units 10,110,28 laterally.

The advantages of the assembly 6 described above are clear from the foregoing. In particular, format changeover takes place relatively quickly and without any manual assembly and disassembly operations on the line 1 (the only manual operations that could possibly be necessary are the engagement and disengagement operations described above, although it is preferable however to adopt interference-free couplings at the motors 19 and 22, or an electric or pneumatic actuator for carrying out the engagement and disengagement actions by means of remote controls): in fact, it is the device 35 that has the task of moving the units 10,110,28 between the working area 11 and the storage area 30, based on commands from an operator or on the automatic management of an electronic control unit.

The guide-and-slide solution is also relatively simple to implement, is relatively robust to adequately support the weights of the units 10,110,28, and makes it possible, with a single simultaneous movement, to move away the unit 10a to be removed from the working area 11 and to position therein the new unit 10b to be used.

The fact that the storage area 30 is above and/or below the working area 11 is particularly advantageous for the overall dimensions of the line 1, since the storage area 30 occupies spaces that are generally not used, and leaves the spaces on the two opposite sides of the line 1 free.

Other advantages also appear from the features described above with reference to the accompanying drawings.

Lastly, it is clear that modifications and variations may be made to the assembly 6 without departing from the scope of protection of the present invention, as defined in the appended claims.

For example, as mentioned above, the line 1 could be structured in a different way: for example, at least one conveyor could be provided between two assemblies 6, and/or the line 1 could include a different number of assemblies 6; or two or more assemblies 6 of the same line 1 could be integrated with each other, so that there is a single structure 31 supporting two or more slides 34 with the respective units 10,110,28.

Moreover, the configuration of the guide 33 and the direction of translation of the slide 34 could be different from what has been described by way of example; or, the various units 10,110,28 could be movable independently of each other to and from the working area 11, under the action of actuator devices which perform the function of the device 35, instead of mounting all the units 10,110,28 on a single movable member, defined by the slide 34.

Furthermore, as mentioned above, one of the motors 19 and 22 could be absent if the track 17 were continuous from the inlet 15 to the outlet 24, or if a transmission were provided to take the motion from the motor 19 and operate the conveyor 21 (or vice versa, to take the motion from the motor 22 and operate the conveyors 18 and 20). Moreover, the motors 19 and/or 22 could be carried by the frames 12 or by the slide 34, instead of being carried by the structure 31.

Lastly, an assembly 6 only comprising the unit 28 and a single unit 10 or 110, which can be interchanged with each other by operating the actuator device 35, could be provided.

The invention claimed is:

1. A configurable assembly for conveying products along a longitudinal direction, the assembly comprising:
   a supporting structure, and
   at least two conveyor units for transferring products along said longitudinal direction;
      at least one of said conveyor units comprising an inlet, an outlet, and at least two tracks that, at said inlet, are arranged side-by-side along a lateral direction, horizontal and orthogonal to said longitudinal direction, so as to receive respective products; and wherein said tracks move towards or farther away from one another along said lateral direction, proceeding from said inlet towards said outlet;

characterised in that the assembly comprises an actuator device, and in that each of said conveyor units is movable with respect to said supporting structure, by the action of said actuator device, between a) a working area, through which said products, in use, are longitudinally transferred, and b) at least one storage area spaced from said working area, such as to selectively arrange one of said units in said working area.

2. The assembly according to claim 1, wherein said storage area is arranged above and/or below said working area.

3. The assembly according to claim 1, furthermore comprising a guide and slide coupling device, which couples said units to said supporting structure and comprises at least one guide and at least one slide; wherein said slide is coupled to said guide and is operated by said actuator device.

4. The assembly according to claim 3, wherein said guide and slide coupling device comprises a single slide that carries all said units.

5. The assembly according to claim 3, wherein said guide is vertical.

6. The assembly according to claim 1, comprising at least one motor carried by said supporting structure in a reference position such as to be able to operate a conveying system of the unit that is arranged in the working area.

7. The assembly according to claim 6, comprising an engaging/disengaging system that can be operated to mechanically couple and decouple said motor to/from a corresponding motor shaft of the unit that is arranged in the working area.

8. The assembly according to claim 7, wherein said engaging/disengaging system comprises, for each said unit, a corresponding guide support, and said units are movable along the respective guide supports such as to be able to be coupled to and decoupled from said motor when they are selectively arranged in said working area.

9. The assembly according to claim 6, further comprising a friction joint or a magnetic joint for coupling said motor to a corresponding motor shaft of the unit that is arranged in said working area.

10. The assembly according to claim 1, wherein said tracks respectively define an upper track and a lower track that diverge from one another upwards and/or downwards starting from said inlet, and wherein said upper track ends at an outlet arranged at a higher level than said lower track and is at least partially superimposed on said lower track along said lateral direction.

* * * * *